A. E. BOGGS.
ELECTRICAL PROTECTIVE DEVICE.
APPLICATION FILED FEB. 4, 1916.
1,305,057.
Patented May 27, 1919.
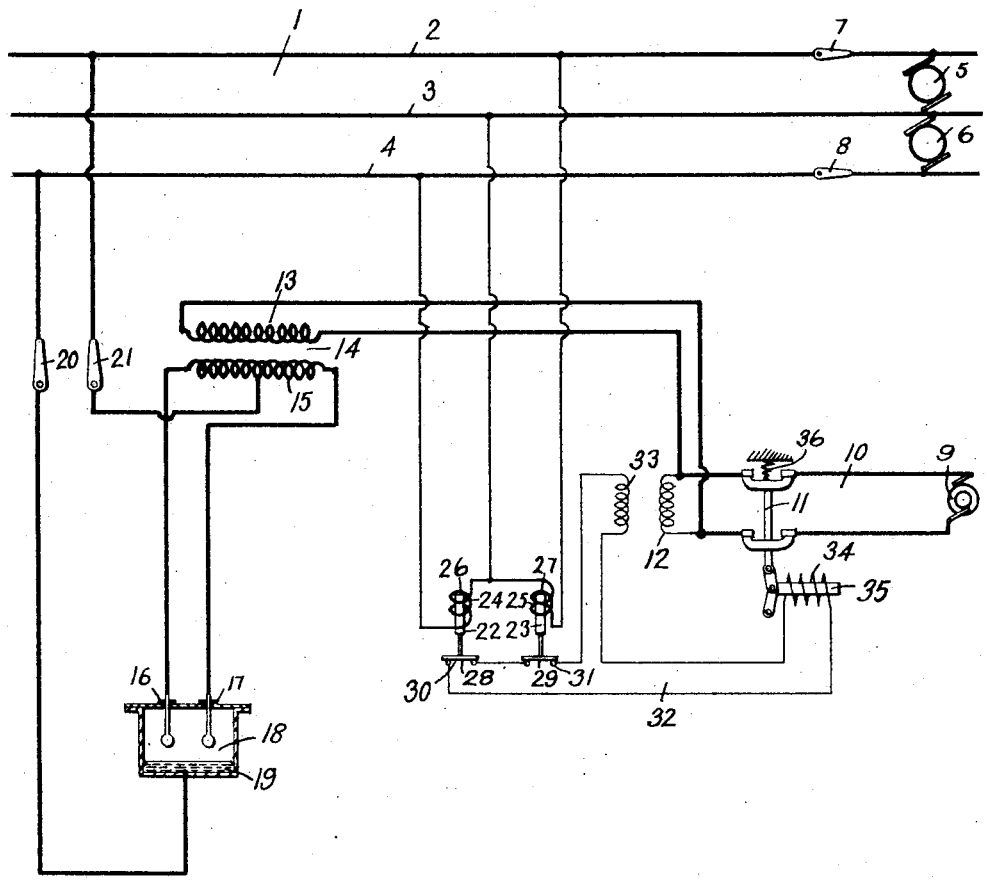
WITNESSES:
Fred H Miller
JA Procter
INVENTOR
Addison E. Boggs
BY
Wesley G. Carr
ATTORNEY

UNITED STATES PATENT OFFICE.

ADDISON E. BOGGS, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICAL PROTECTIVE DEVICE.

1,305,057. Specification of Letters Patent. Patented May 27, 1919.

Application filed February 4, 1916. Serial No. 76,161.

*To all whom it may concern:*

Be it known that I, ADDISON E. BOGGS, a citizen of the United States, and a resident of Pittsburgh, in the county of Allegheny and State of Pennsylvania, have invented a new and useful Improvement in Electrical Protective Devices, of which the following is a specification.

My invention relates to electrical-protective devices and particularly to protective devices for multi-voltage distribution systems that are supplied with energy from both multi-voltage and uni-voltage sources.

The object of my invention is to provide a protective device for a distribution system of the above indicated character that is adapted to interrupt one source of energy when its voltage drops to a predetermined value and when the voltages across the system become unbalanced and rise in value, because of an interruption of the other source of energy.

Frequently, it is necessary to provide an auxiliary source of energy for supplementing the main source of energy of an electric circuit. Particularly is this true when a direct-current, multi-voltage three-conductor circuit is supplied from a source of energy having relatively poor regulation. In such instances, it has been found desirable to use the energy generated by a well-regulated auxiliary source of alternating current for the purpose of supplying the fluctuations of the load. However, if a converter is used for converting the energy of the auxiliary source of alternating current to direct-current energy having a single voltage, serious difficulty will obtain if the direct-current source of energy is interrupted, because the circuit will usually become unbalanced and its voltage will rise. In order to prevent the apparatus that is connected to the circuit from being damaged when the circuit becomes unbalanced and when its voltage rises, it is desirable to disconnect the auxiliary source of energy, and, in order to obtain this result, I provide a relay device for deenergizing the holding coil of the circuit interrupter when the aforesaid conditions obtain.

The single figure of the accompanying drawing is a diagrammatic view of a portion of the distribution system embodying my invention.

A system, in connection with which my invention may be used, comprises a three-conductor multi-voltage circuit 1 having conductors 2, 3 and 4 that are supplied with direct-current energy from two generators 5 and 6 which are so connected to the circuit 1 that the voltage between the conductors 2 and 4 is equal to the sum of the voltages between the conductors 2 and 3 and 3 and 4, respectively. Circuit interrupters 7 and 8 are disposed in the circuit of the conductors 2 and 4, respectively, and may be controlled either manually or by automatic means (not shown) for opening them upon the occurrence of predetermined conditions.

A single-phase, alternating-current generator 9 supplies energy to a circuit 10 that comprises a circuit interrupter 11, the primary winding of a potential transformer 12 and the primary winding 13 of a power transformer 14. The secondary winding 15 of the transformer 14 is operatively connected to the anodes 16 and 17 of a vapor converter 18. A cathode 19 of the converter 18 is connected, through a switch 20, to the conductor 4 of the circuit 1, and the mid-point of the winding 15 of the transformer 14 is connected, through a switch 21, to the conductor 2 of the circuit 1. Thus, the generator 9, which is assumed to have good regulation, is adapted to supplement the energy supplied by the generators 5 and 6 for the purpose of compensating for the fluctuations in load on the circuit 1.

Two relays 22 and 23 comprise windings 24 and 25, movable core members 26 and 27 and movable contact members 28 and 29, respectively. One terminal of each of the windings 24 and 25 is connected to the neutral conductor 3 of the circuit 1. The other terminals of the windings 24 and 25 are connected to the conductors 4 and 2, respectively, of the circuit 1, and the windings are so proportioned that, when the voltage across the conductors 2 and 3 or that across the conductors 3 and 4 rises to a predetermined value the respective movable contact members 28 and 29 will be disengaged from their stationary contact members 30 and 31. The stationary contact members 30 and 31 are series connected in a circuit 32 comprising the secondary winding 33 of the potential transformer 12 and the winding 34 of a holding electromagnet 35.

The electromagnet 35 is adapted to hold the circuit interrupter 11 in its closed circuit position so long as the voltage upon the circuit 10 is above a predetermined value. However, when the voltage impressed upon the circuit 10 drops to a predetermined value, the winding 34 becomes sufficiently deënergized to permit a spring 36 to open the circuit interrupter 11. Also, when the voltages across the conductors 2 and 3 and 3 and 4 become unbalanced, because one or both of the voltages rise above a predetermined value, the respective contact members 28 and 29 will be disengaged from their stationary contact members 30 and 31, thus deënergizing the winding 34 to trip the circuit interrupter 11.

I do not limit my invention to the particular device illustrated, as it may be variously modified without departing from the spirit and scope of the invention as set forth in the appended claims.

I claim as my invention:

1. In a system of distribution, the combination with a multi-voltage circuit, a source of energy therefor, and a second source of energy operatively connected to the outside conductors of the multi-voltage circuit, of a single means for disconnecting the said second source of energy when the voltage between the neutral conductor and either of the outside conductors of the multi-voltage circuit exceeds a predetermined value, and under predetermined conditions in the second source of energy.

2. In a system of distribution, the combination with a multi-voltage circuit, a source of energy therefor, and a second source of energy operatively connected to the outside conductors of the multi-voltage circuit, of means for disconnecting the said second source of energy when the voltages of the multi-voltage circuit exceed predetermined values and when the voltage of the second source of energy falls below a predetermined value.

3. The combination with a two-voltage, three-conductor circuit, means for supplying the circuit with energy, and a second source of energy operatively connected to the circuit, of means for disconnecting the second source of energy when the voltages of the three-conductor circuit exceed predetermined values and become unbalanced because of the interruption of the first mentioned means, and when the voltage of the second source of energy falls below a predetermined value.

4. The combination with a two-voltage, three-conductor circuit, means for supplying the circuit with energy, and a second source of energy operatively connected to the circuit, of means for disconnecting the second source of energy when the first mentioned means is interrupted, and when the voltage of the second source of energy falls below a predetermined value.

5. In a system of distribution, the combination with a three-conductor, direct-current circuit, means for supplying multi-voltage energy thereto, a single-phase alternating-current source of energy, and a converter operatively connected between two conductors of the direct-current circuit and the alternating-current circuit, of means for interrupting the alternating current circuit when the direct current circuit is interrupted and when the voltage of the alternating-current circuit falls below a predetermined value.

6. In a system of distribution, the combination with a three-conductor direct-current circuit, means for supplying multi-voltage energy thereto, a single-phase, alternating-current source of energy, and a converter operatively connected between two conductors of the direct-current circuit and the alternating-current circuit, of means for interrupting the alternating current circuit when the voltage of the direct current circuit exceeds a predetermined value, and under predetermined conditions in the alternating-current circuit.

7. In a system of distribution, the combination with a three-conductor, direct-current circuit, means for supplying multi-voltage energy thereto, a single-phase, alternating-current source of energy, and a converter operatively connected between two conductors of the direct-current circuit and the alternating-current circuit, of a single means for interrupting the alternating-current circuit when the direct-current circuit is interrupted and when the voltage of the alternating-current circuit decreases to a predetermined value.

In testimony whereof, I have hereunto subscribed my name this 27th day of Jan., 1916.

ADDISON E. BOGGS.

Copies of this patent may be obtained for five cents each, by addressing the "Commissioner of Patents, Washington, D. C."